(12) United States Patent
Mahugo Criado

(10) Patent No.: US 11,239,592 B2
(45) Date of Patent: Feb. 1, 2022

(54) CONNECTING DEVICE FOR FEED LINES

(71) Applicant: Power Link Security, S.L., Valencia (ES)

(72) Inventor: Juan Antonio Mahugo Criado, Valencia (ES)

(73) Assignee: Power Link Security, S.L., Valencia (ES)

(*) Notice: Subject to any disclaimer, the term of this patent is extended or adjusted under 35 U.S.C. 154(b) by 0 days.

(21) Appl. No.: 16/489,362

(22) PCT Filed: Feb. 27, 2018

(86) PCT No.: PCT/ES2018/000017
§ 371 (c)(1),
(2) Date: Aug. 28, 2019

(87) PCT Pub. No.: WO2018/158473
PCT Pub. Date: Sep. 7, 2018

(65) Prior Publication Data
US 2020/0076102 A1    Mar. 5, 2020

(30) Foreign Application Priority Data

Feb. 28, 2017 (ES) .............................. ES201730208U

(51) Int. Cl.
*H01R 13/00* (2006.01)
*B60T 17/04* (2006.01)
(Continued)

(52) U.S. Cl.
CPC ............ *H01R 13/005* (2013.01); *B60T 17/04* (2013.01); *F16L 11/22* (2013.01); *F16L 25/01* (2013.01);
(Continued)

(58) Field of Classification Search
CPC .......... F16L 25/01; F16L 11/127; F16L 11/22; F16L 37/107; F16L 37/413; F16L 39/00;
(Continued)

(56) References Cited

U.S. PATENT DOCUMENTS

| 3,034,085 A | * | 5/1962 | Pauler | ................... | H01R 13/005 |
| | | | | | 439/191 |
| 3,673,541 A | * | 6/1972 | Volinskie | ................ | F16L 25/01 |
| | | | | | 439/195 |

(Continued)

FOREIGN PATENT DOCUMENTS

| EP | 0800234 | 10/1997 |
| GB | 2308509 | 6/1997 |
| WO | WO 2018/158473 | 9/2018 |

OTHER PUBLICATIONS

International Search Report and the Written Opinion dated Aug. 2, 2018 From the International Searching Authority Re. Application No. PCT/ES2018/000017. (16 Pages).
(Continued)

*Primary Examiner* — Abdullah A Riyami
*Assistant Examiner* — Justin M Kratt

(57) ABSTRACT

The invention relates to a device for connecting feed lines, comprising: first electrical connector elements which can each be connected to a power supply, and first fluid connection elements which can be connected to a working fluid source, all of said elements being grouped together in a fixed manner in a first stationary connector; a power feed line, a working fluid feed line; and a second fluid connection element coupled to a first end of a flexible tube and second electrical connector elements, grouped together in a fixed manner in a first movable connector. According to the invention, at least first end segments of the second electrical
(Continued)

connector elements and of the flexible tube are disposed inside an elastically flexible hose that is connected to the first movable connector.

18 Claims, 10 Drawing Sheets

(51) Int. Cl.

| | | |
|---|---|---|
| *F16L 11/22* | (2006.01) | |
| *F16L 25/01* | (2006.01) | |
| *F16L 37/107* | (2006.01) | |
| *F16L 37/413* | (2006.01) | |
| *H01B 7/06* | (2006.01) | |
| *H01R 13/625* | (2006.01) | |
| *H01R 13/64* | (2006.01) | |
| *B61G 5/06* | (2006.01) | |
| *F16L 39/00* | (2006.01) | |
| *F16L 11/127* | (2006.01) | |
| *H01R 9/22* | (2006.01) | |
| *H01R 13/52* | (2006.01) | |
| *B60R 16/00* | (2006.01) | |

(52) U.S. Cl.
CPC ........... *F16L 37/107* (2013.01); *F16L 37/413* (2013.01); *H01B 7/06* (2013.01); *H01R 13/625* (2013.01); *H01R 13/64* (2013.01); *B60R 16/00* (2013.01); *B61G 5/06* (2013.01); *F16L 11/127* (2013.01); *F16L 39/00* (2013.01); *H01R 9/22* (2013.01); *H01R 13/52* (2013.01)

(58) Field of Classification Search
CPC .... H01R 13/005; H01R 13/625; H01R 13/64; H01R 9/22; H01R 13/52; B60T 17/04; H01B 7/06; B60R 16/00; B61G 5/06
USPC ....... 439/3, 5, 179, 190, 191, 192, 195, 196, 439/199
See application file for complete search history.

(56) References Cited

U.S. PATENT DOCUMENTS

| | | | | |
|---|---|---|---|---|
| 6,713,711 | B2* | 3/2004 | Conway | B23K 9/323 |
| | | | | 219/121.48 |
| 7,465,177 | B2* | 12/2008 | Wood | H01R 13/005 |
| | | | | 439/191 |
| 9,231,323 | B1* | 1/2016 | Jaeger | H01R 13/005 |
| 2003/0089689 | A1* | 5/2003 | Conway | H01R 13/005 |
| | | | | 219/121.51 |
| 2009/0123221 | A1 | 5/2009 | Marshall | |
| 2010/0038899 | A1* | 2/2010 | Clover | F16L 39/00 |
| | | | | 285/120.1 |
| 2014/0106587 | A1 | 4/2014 | Verhagen | |
| 2016/0003426 | A1* | 1/2016 | Yu | F21V 23/02 |
| | | | | 362/190 |
| 2017/0117664 | A1* | 4/2017 | Yoshigi | H01R 13/633 |

OTHER PUBLICATIONS

Tectran "AirPower Line LIFELine Kit", Tectran Solutions for Transportation Equipment, retrieved from Tectran.com, pp. 1-5, Dec. 11, 2016.

* cited by examiner

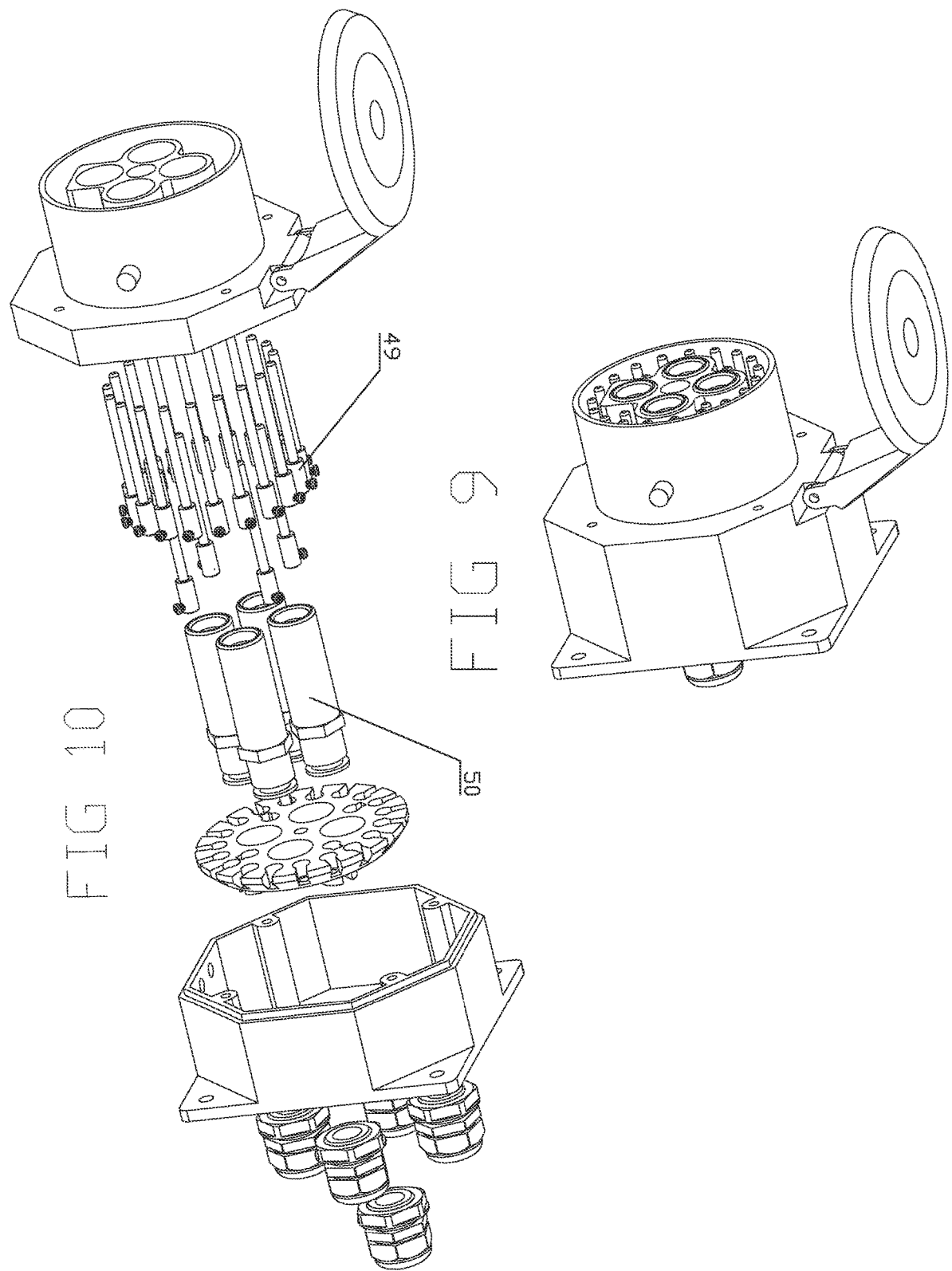

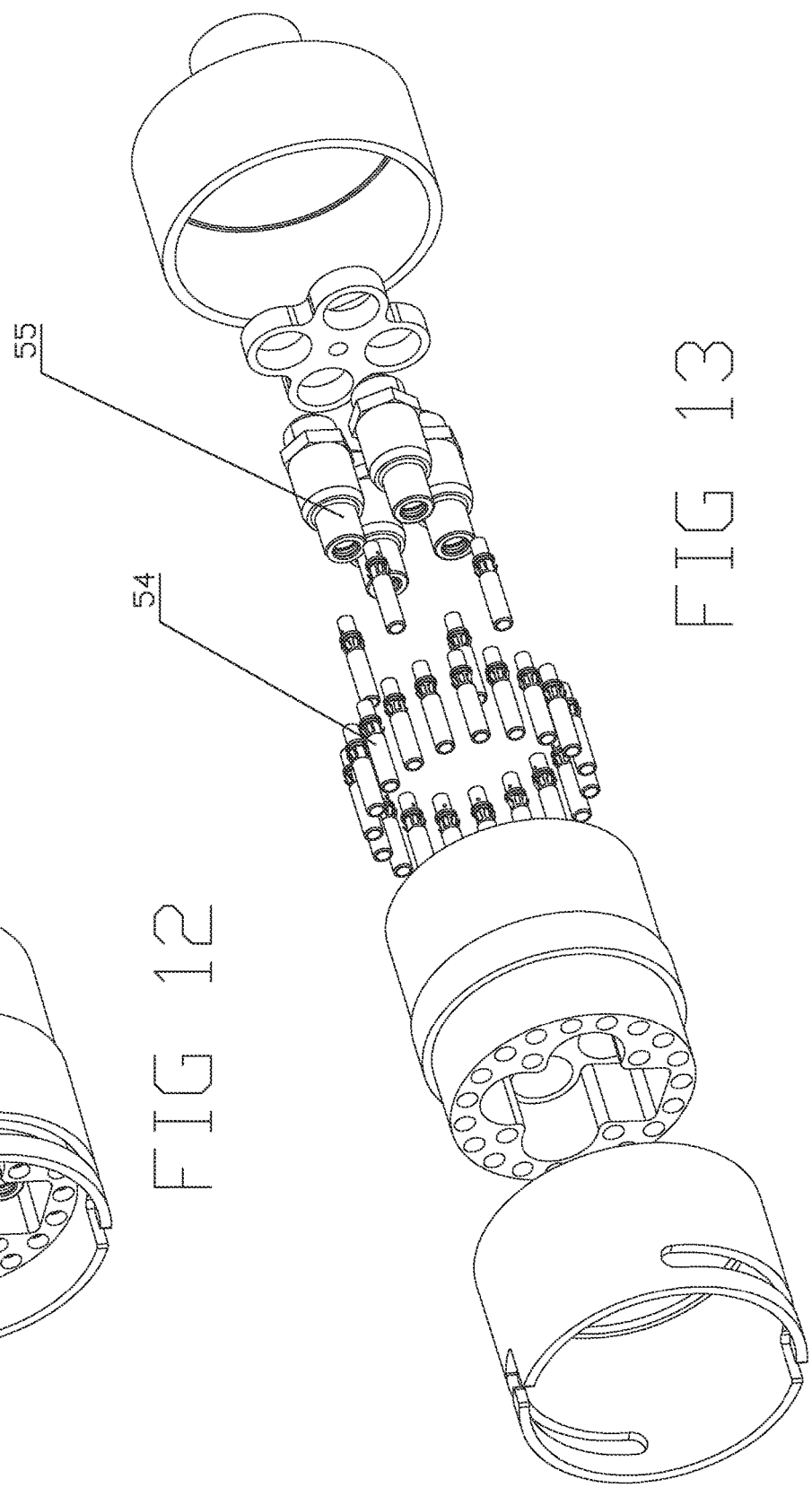

CONNECTING DEVICE FOR FEED LINES

RELATED APPLICATIONS

This application is a National Phase of PCT Patent Application No. PCT/ES2018/000017 having International filing date of Feb. 27, 2018, which claims the benefit of priority of Spanish Patent Application No. U201730208 filed on Feb. 28, 2017. The contents of the above applications are all incorporated by reference as if fully set forth herein in their entirety.

FIELD AND BACKGROUND OF THE INVENTION

The present invention falls within the technical field of feed line connections which are used to supply, through feed lines, power and working fluids, such as pneumatic fluids and hydraulic fluids, from a supply source to parts and devices requiring power or such working fluids for the operation thereof.

These connections are especially used between motor vehicles, especially lorries, and the trailers or semi-trailers thereof, but also for example between tractor machines and railroad cars.

Currently, the electrical and pneumatic or hydraulic connection between the tractor unit of a heavy vehicle and the corresponding trailer thereof is usually performed through a plurality of power feed lines with the different electrical connector elements thereof coupled at respective ends of the electrical cables, and in the case of feed lines for working fluids, such as pneumatic or hydraulic lines, fluid connection elements. It is of vital importance for the operation and circulation of the vehicle that these feed lines work perfectly, since they feed the safety systems necessary for the circulation of the vehicle.

The feed lines are usually made up of spiral hoses, which enables the distension and contraction thereof when withstanding the manoeuvres of the vehicle in different everyday manoeuvre situations. The location of the feed lines is limited to a reduced space, for example the one between the tractor unit and the trailer, which causes an interaction between them, as well as friction, hooking, bumps, etc., and on numerous occasions it results in one or several of said lines breaking, produced by a manoeuvre of the vehicle or simply by the interaction produced between them, namely bumps, distension or wear. Also, in practice, the wear of the hoses is uneven depending on whether they are electrical or pneumatic connections.

Since it is a solution involving several elements, in order to safeguard the operation of the vehicle, this forces the driver of the vehicle to carry the corresponding spare part somewhere therein for each element in order to be able to replace the used part with a new one in the backup kit in case of a breakdown, since if something breaks and said spare part is not available, the vehicle is immobilised with the consequent harm to costs, time, etc.

Indeed, the current solution for connections, at a minimum, requires drivers or users of heavy vehicles to pay attention to the care of these feed lines, the connections thereof, have at all times the necessary stock on board the vehicle of the corresponding spare parts as well as the replacement thereof once the item in question has been repaired.

Furthermore, in conventional systems each feed line must be connected separately, which requires the user's attention and time when performing the connections of the different lines between the connectors connected to the power or pressure supply and the connectors connected to the elements consuming power or pressure. If the uneven wear of each hose is added to this, it creates a situation with unpredictable and constant breakdowns and replacement of hoses, without the useful life of all of these being able to be adequately foreseen or coordinated.

Another disadvantage of the connection devices of the prior art is that when the fluid connection hoses are disconnected from the stationary connectors, the working pressure and fluid are lost, which in practice leads users to leave said hoses hanging from the stationary connector, which increases not only the exposure thereof to dirt and wear, but also the risk and frequency of theft.

SUMMARY OF THE INVENTION

The object of the present invention is to overcome the aforementioned drawbacks of the state of the art, by means of a device for connecting feed lines comprising: first electrical connector elements which can each be connected to a power supply, first fluid connection elements which can be connected to a working fluid supply, a power feed line comprising a plurality of electrical cables with corresponding second electrical connector elements coupled at respective first ends of the electrical cables, and which can each be connected to one of the first electrical connector elements in a male-female connection, a working fluid feed line comprising at least one flexible tube which conducts a working fluid with a second fluid connection element coupled at a first end of a flexible tube, designed to carry a working fluid selected from between pneumatic fluids and hydraulic fluids, and which can each be connected to a first fluid connection element in a first quick connection, the connection device being characterised in that the first electrical connector elements of the power feed line and each first fluid connection element of the working fluid feed line are grouped and immobilised in a first stationary connector; the second electrical connector elements and each second fluid connection element are grouped together in a fixed manner in a first movable connector; the first and second electrical connector elements and the first and second fluid connection elements are disposed such that, when the movable connector is connected to the stationary connector, each first electrical connector element and each second electrical connector element are connected to each other in a male-female electrical connection, and each first fluid connection element and each second fluid connection element are connected to each other in a male-female fluid connection; at least first end segments of the electrical cables and of each flexible tube are disposed inside an elastically flexible hose connected to the first movable connector.

Through the first stationary connector, the first electrical connector elements and each first fluid connection element can be connected to the respective power supplies and working fluid supply, such as the power supplies existing in the tractor unit of a heavy motor vehicle for which the first stationary connector may be assembled, for example, on the outer wall of the cabin of the tractor unit.

In one embodiment of the invention, the connection device further comprises a second movable connector wherein third electrical connector elements connected at second ends of the electrical cables and at least a third fluid connection element at a second end of each flexible tube are grouped together in a fixed manner. Furthermore, according to this embodiment, the connection device comprises a second stationary connector wherein fourth electrical connector elements which can be connected to the third additional electrical connector elements in a male-female connection, and at least a fourth fluid connection element which can be connected to each third fluid connection element are grouped together in a fixed manner. Preferably, the third and fourth electrical connector elements and the third and fourth fluid connection elements are disposed such that, when the movable connector is connected to the stationary connector, each third electrical connector element and each fourth electrical connector element are connected to each other in a female-male electrical connection, and each third fluid connection element and each fourth fluid connection element are connected to each other in a female-male fluid connection.

Through the second stationary connector, the fourth electrical connector elements and each fourth fluid connection element can be connected to the respective panels and devices which require power or such working fluids for the operation thereof, such as the elements which consume them in a trailer or semi-trailer (for example brakes, lighting, signalling, air conditioning, weighing, etc.) of a heavy motor vehicle, for which the second stationary device may be mounted on the front of the trailer or semi-trailer facing the rear wall of the cabin of the tractor unit.

The second stationary connector and the second movable connector may have inverse structures and functions similar to those of the first stationary connector and the first movable connector.

Preferably, the hose comprises a spiral segment and at least one flat end segment. Each flat end segment of the hose is connected to a movable connector.

In one embodiment of the invention, the working fluid feed line comprises at least one main flexible tube for the passage of outlet working fluid coming out from the working fluid feed supply from the first fluid connection element to the second fluid connection element, and at least one secondary flexible tube for the passage of return working fluid coming from elements which consume working fluid.

In a preferred embodiment of the first stationary connector, it comprises a body made of electrically insulating material with a rear portion, an intermediate portion and a front portion.

The rear portion of the body comprises electrical input connections and at least one working fluid inlet, the intermediate portion comprises intermediate electrical connections which connect the electrical input connections with the first electrical connectors, and the front portion comprises the first electrical connector elements and the first fluid connection element(s).

The first electrical connector elements of the stationary connector can be disposed in the vicinity of the fluid connection element(s) either in a peripheral, inner or mixed area of the front face area of the front portion of the body, while the second electrical connector elements and the second fluid connection element(s) of the movable connector are disposed in the front face of the movable connector in a complementary manner with respect to the first electrical connector elements and each first fluid connection element in order to thus form respective male-female connections.

The first electrical connector elements can consist of electrical pins which form male electrical connector elements, and surrounded by an external perimeter partition.

Also preferably, the intermediate portion of the body made of electrically insulating material comprises at least one internal chamber which receives the working fluid entering through the inlet for working fluid and connected to at least one first fluid connection element. In this case, each first fluid connection element is preferably a fluid fitting, meaning according to whether the working fluid is a pneumatic fluid, it is a pneumatic fitting and, if the working fluid is a hydraulic fluid, it is a hydraulic fitting, provided with a valve operated by pressure or a manual operation which closes the passage of the working fluid preventing the discharge thereof when the second fluid connection element, a male element, is not inserted and which is unlocked when the corresponding second fluid connection element is inserted into the first fluid connection element and enables the passage of working fluid. Each valve may conveniently be provided with at least one gasket which ensures the seal by contact with the channel through which it travels. The closure can be ensured by means of at least one elastic element which will press the gasket against the channel and the valve is designed such that the surface thereof can take advantage of the pressure in order to close the circuit.

According to this embodiment of the connection device according to the invention, the first movable connector comprises a main body with a front portion which has corresponding holes wherein respective electrical contact bushings are inserted which make up the second electrical connector elements and wherein the electrical pins of the stationary connector are inserted when the latter is coupled to the first movable connector. The rear portions of the bushings are connected to the electrical cables. In turn, in this case each second working fluid connection element can be a tubular passage and be made up of a male working fluid connection element which presses on or manually operates and, therefore, opens the corresponding valve of the stationary connector. In the rear portion of the tubular passage, the rear portion of the first movable connector is connected to the flexible tube of the hose, and the intermediate portion of the tubular passage can be integrated into the main body of the movable connector. In this manner, each valve will be opened by pressure, a manual operation or a combination of both, when the movable connector is completely coupled to the stationary connector. The front portion of the passage of the first movable connector will press on the corresponding valve, which will therefore move it such that the working fluid passes through the valves and enters the flexible tube of the hose. Said manual operation for opening valves could alternatively be executed either by means of a manual key or by means of an automation that would open or close the chambers.

In order to ensure said coupling between the first stationary connector and the first movable connector, one of them, preferably the stationary one, can be provided with a fastening and interlocking element, such that, when the movable connector is coupled to the stationary one, said fastening element performs a manual operation to ensure the coupling between the portions and the opening of the valves. The interlocking element can be actuated by a rotation or a rectilinear movement which is longitudinal to the forward direction of the working fluid. In both cases, the movement of the interlocking element must ensure a sequence of circumstances within the connecting of both connectors like the one described below.

In a first stage of the operation of the interlocking element, the contact of both elements must be ensured without changing the position thereof with respect to each other. This can be achieved through the actuation of one or several pivots secured to the interlocking element which is inserted into a slot of the movable connector or vice versa. When the pivots enter said slot, the movable connector can no longer be accidentally released, since the interlocking element ensures the position of the movable connector and prevents it from being released. This first stage is very important in the safety of the handling of the connectors, since in the next stage the transmission of compressed fluids will occur, which could lead to accidents there is any chance that the movable connector could come out on its own. Alternatively, the pivots could be in the movable connector and the channels in the interlocking element. If the interlocking element is in the movable connector, the interaction would be made with the stationary connector.

In a second stage, the shape of the slots changes direction moving away from the connecting area. In this manner, when the pivots pass through the slots, both connectors move closer. The first and second fluid connection elements are pressed against each other, moving the internal valves and enabling the working fluid to leave the sealing chamber and circulate through the flexible tube of the hose. At that time, the position of the movable connector must be ensured and it must be prevented from being released. A possible alternative to this solution is, when the interlocking element is handled, to move the sealing chamber, but not the valve such that the air passage stays open as in the previous case.

Finally, in a third stage, the interlocking element must pass through an interlocking area. Meaning, it must be secured by an integrated element or positioner of the connector which prevents the interlocking element from moving or rotating if it is not done so by the hand of the user on purpose. This effect can be achieved in different manners, such as for example, that the channels through which the pivots circulate become narrower, or change direction again so as to prevent it from rotating or moving without overcoming said change in direction or protrusion.

The pivot can also be made to pass through a commercial or integrated positioner in the casing which holds the interlocking element and a certain force needs to be exerted in order to get out of this situation.

In the event that the hose is loaded with pressure and it is intended that it be separated from the stationary connector, when the interlocking element is in the second handling position of the valves, the air can be allowed to exit through a hole such that the connecting area between the movable connector and the stationary connector, both lines stay at the same ambient pressure, while the interlocking element continues to keep the connectors together. Lastly, when the end of the first stage is reached, both connectors are loose and the hybrid hose can be safely removed.

In the coupling between the second movable connector and the second stationary connector, the same circumstances described above occur with respect to the opening of the pneumatic valves and the manual operation of the interlocking element, but inversely, since the hybrid hose is what is loaded with pressurised working fluid and the consumers of working fluid are at ambient pressure.

The valve(s) can be especially manufactured to be adapted to the stationary connector or commercial valves and handling the casings for opening the valves, all in unison with an element integrated into the casings. The valves will be elements integrated in the same parts as the ones the casing is made up of, meaning they will all form one element. Although in a second embodiment, these may be external elements adapted and inserted into the casing.

In both cases, the effect achieved is the same, which when contact of the stationary and movable connector is made, the valves open and when both connectors separate, the valves close.

It is also possible to configure the device such that the manual operation of the valves and ensuring the interlocking of the connectors is performed remotely and/or in an automated manner.

BRIEF DESCRIPTION OF THE SEVERAL VIEWS OF THE DRAWINGS

Aspects and embodiments of the invention are described below, based on schematic drawings, wherein.

Figure 1:
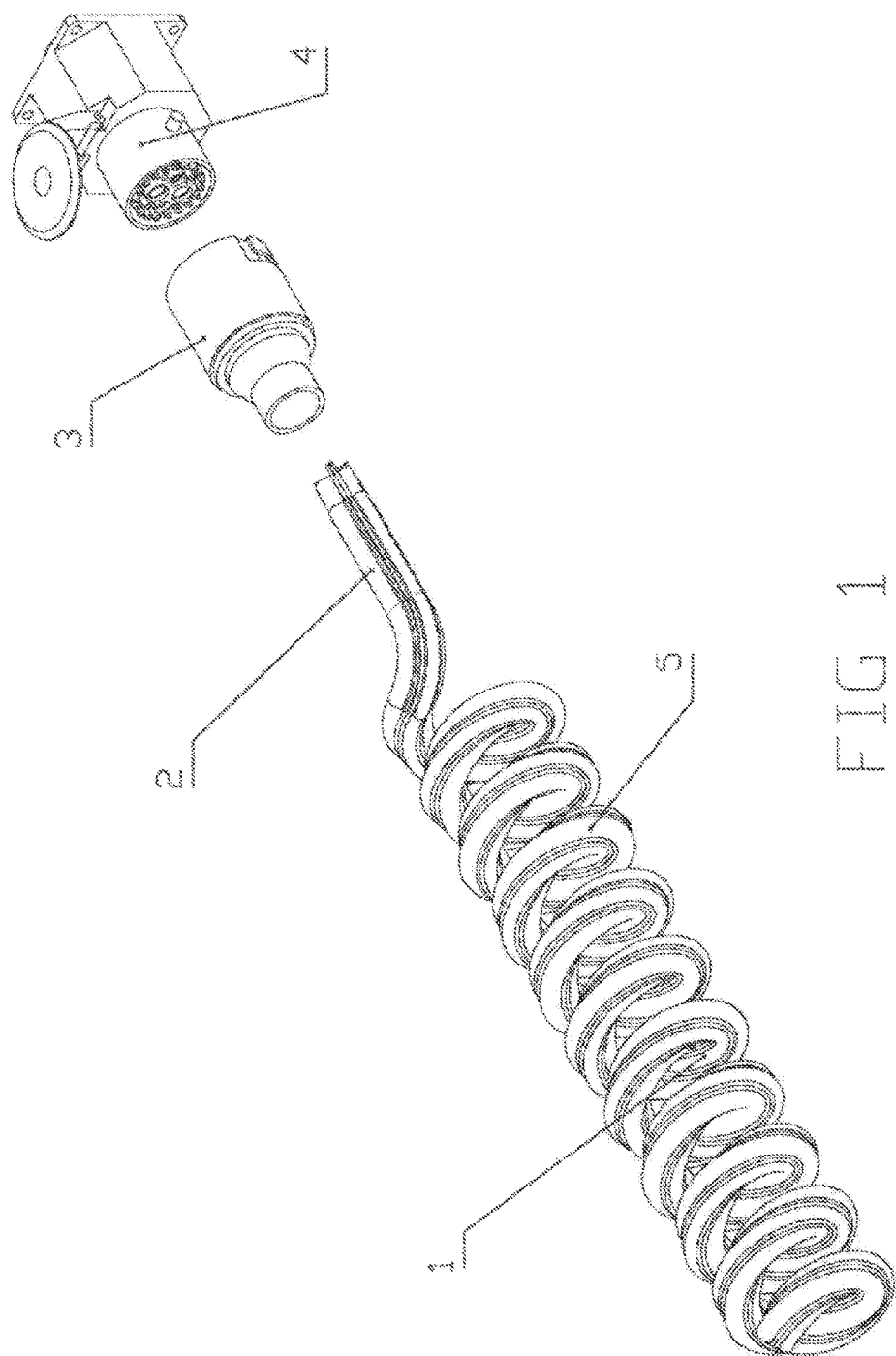
FIG. 1 is a perspective view of a portion of the hose, the movable connector and the stationary connector according to the invention.
Figure 2:
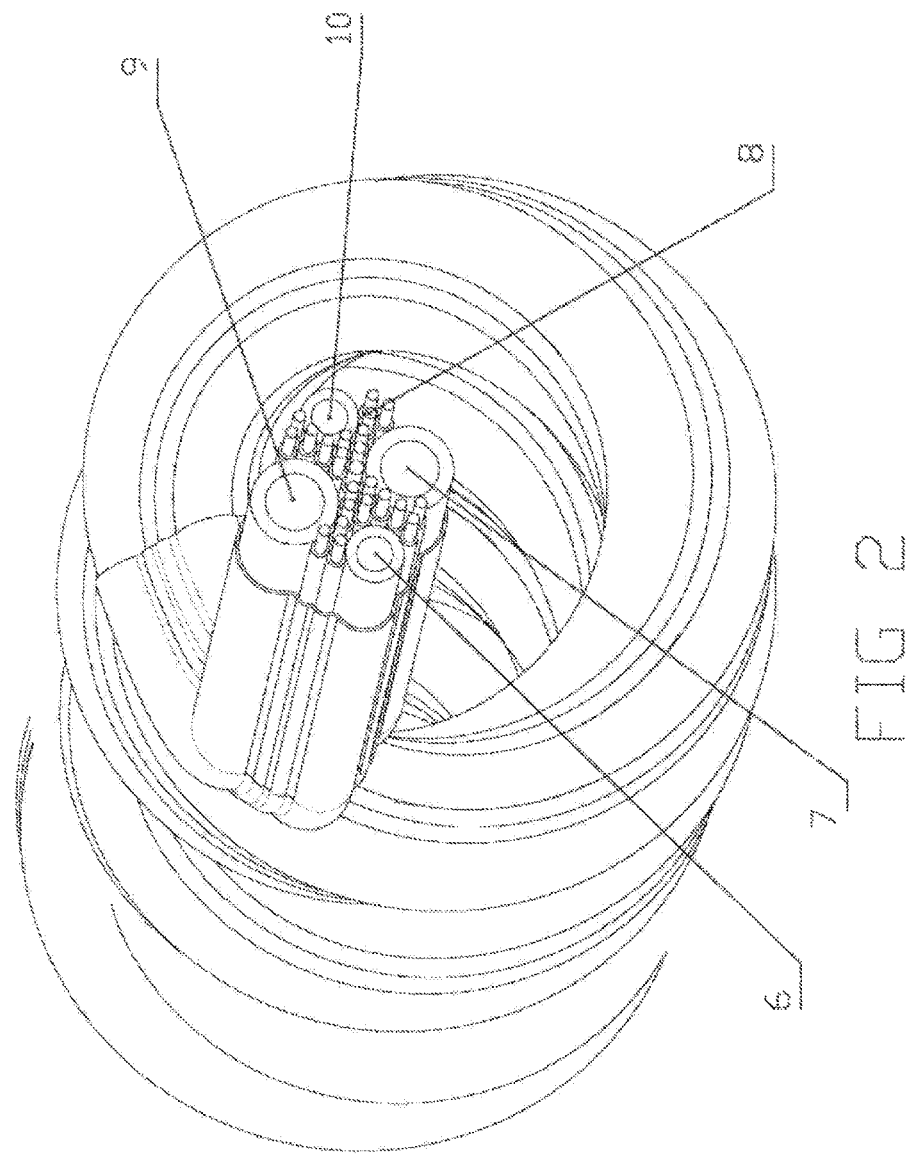
FIG. 2 is a detailed perspective view of the hose illustrated in FIG. 1 but without being coupled to the movable connector.
Figure 3:
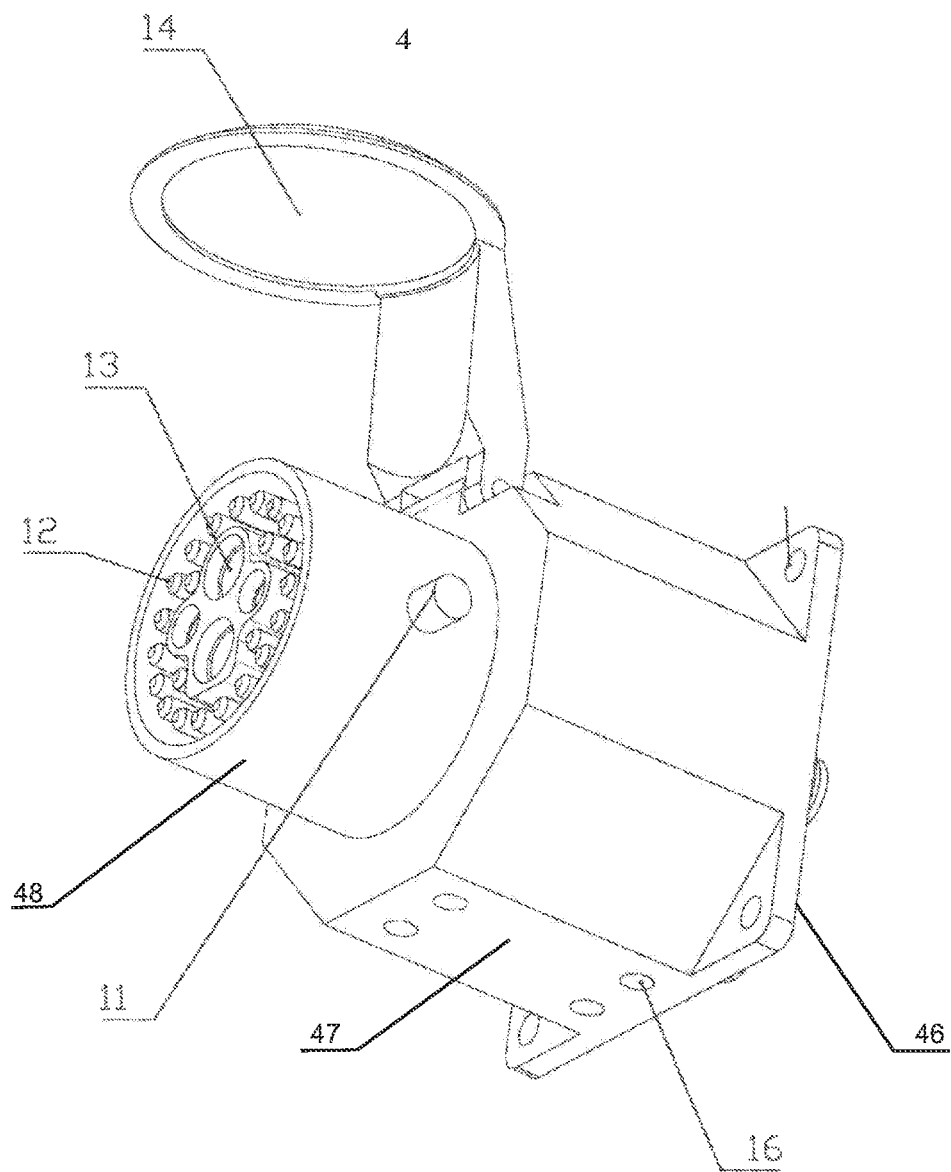
FIG. 3 is a detailed front perspective view of the stationary connector illustrated in FIG. 1.
Figure 4:
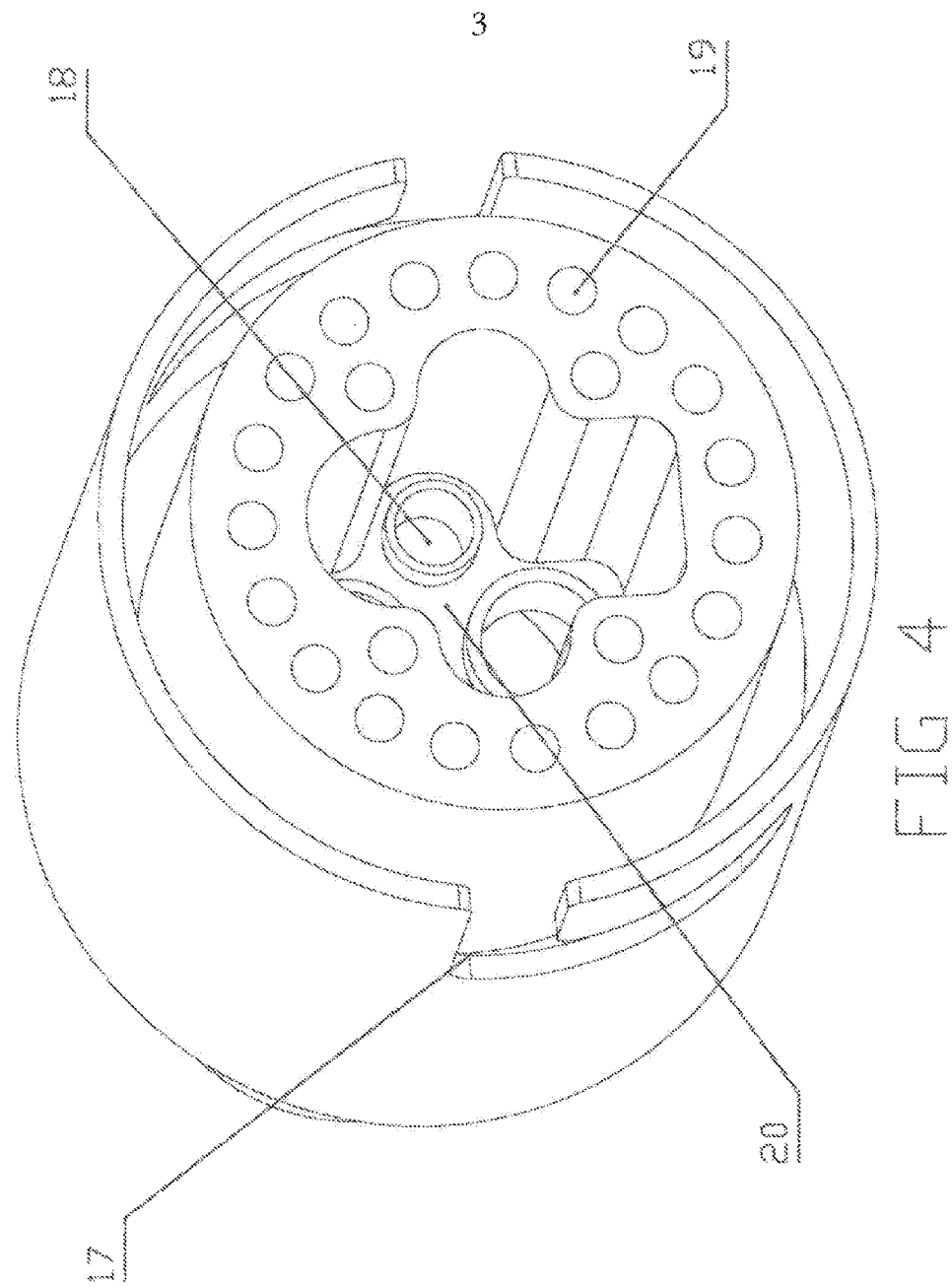
FIG. 4 is a detailed front perspective view of the movable connector illustrated in FIG. 1.
Figure 5:
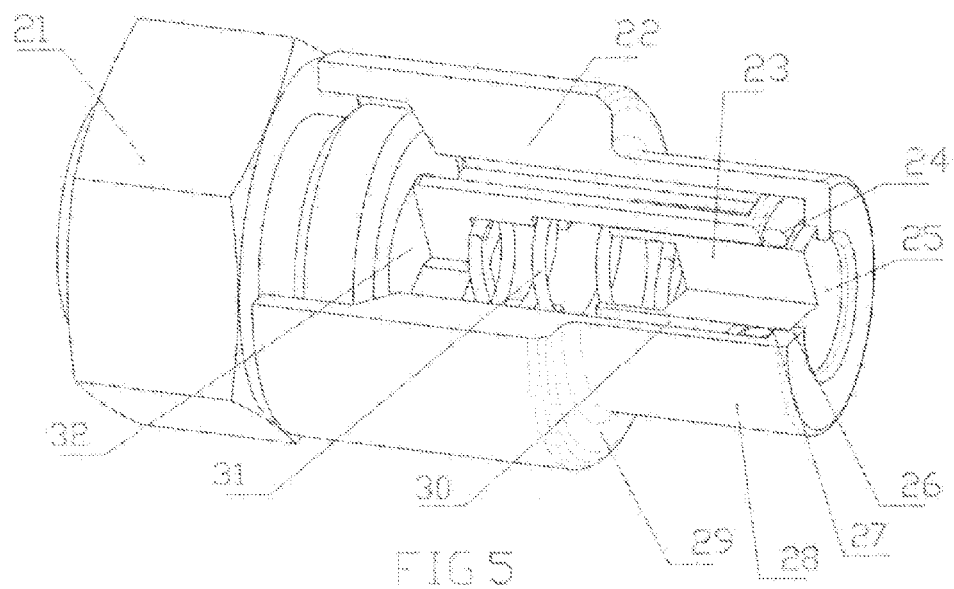
FIG. 5 is a detailed side perspective view of the closed male pneumatic connection.
Figure 6:
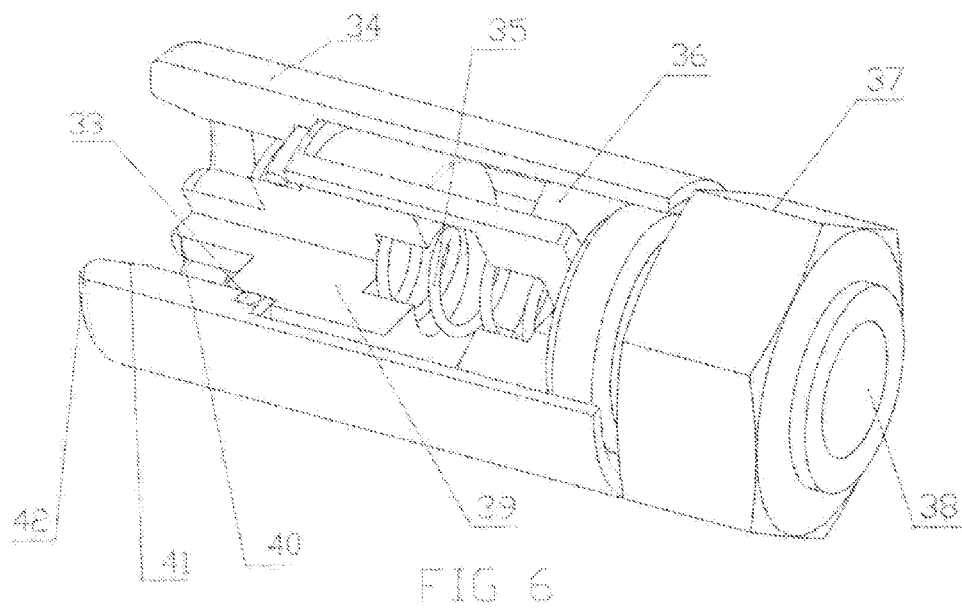
FIG. 6 is a detailed side perspective view of the closed female pneumatic connection.
Figure 7:
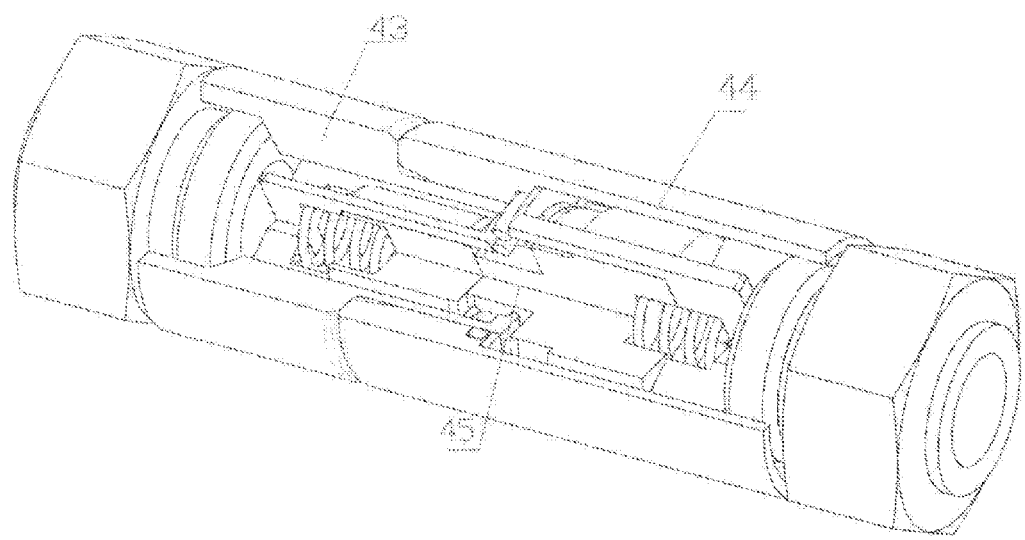
FIG. 7 is a detailed side perspective view of the male and female pneumatic connection assembled with the passage open The reference signs that appear in these figures identify the elements indicated below.
Figure 8:
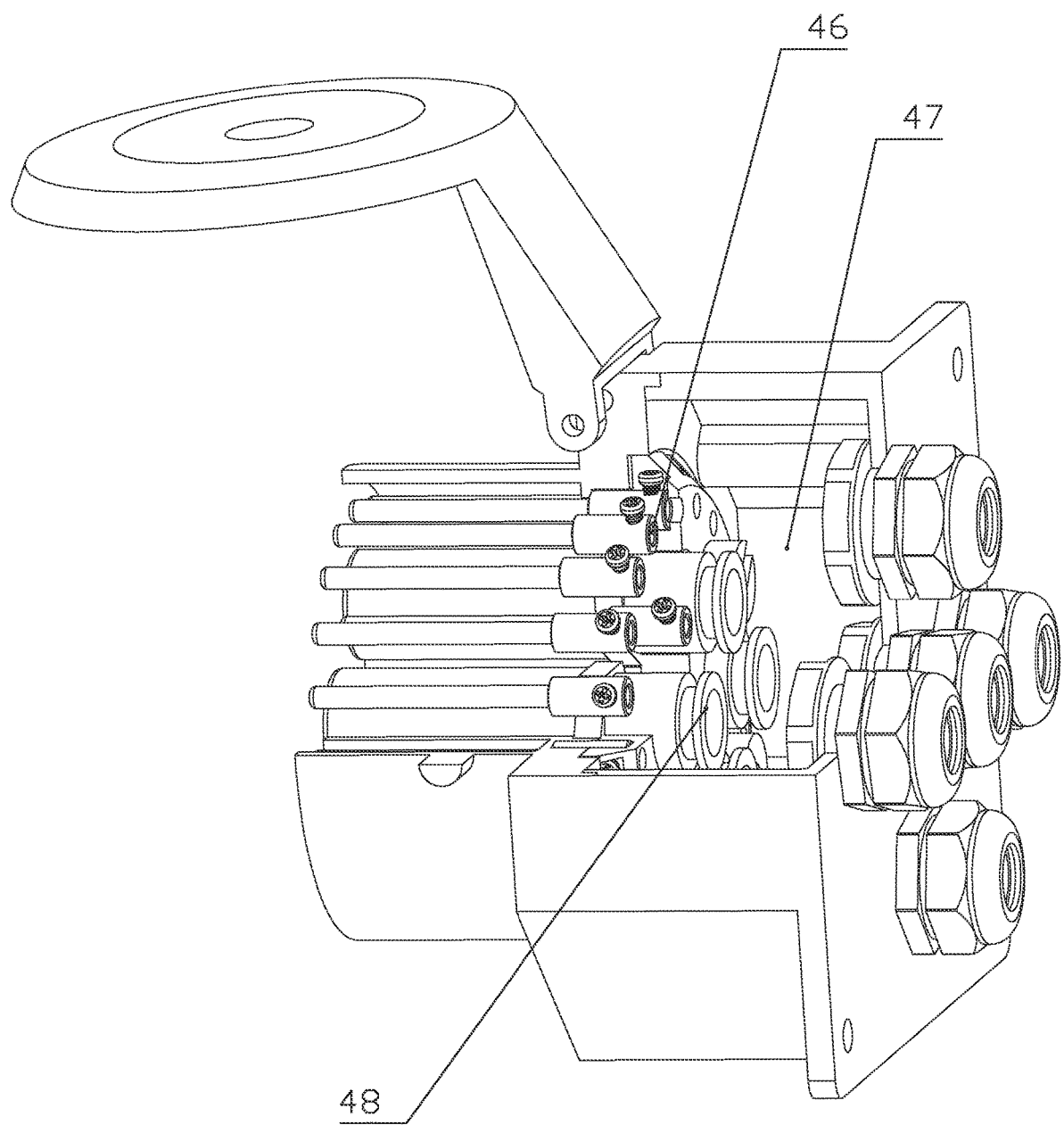
Figure 11:
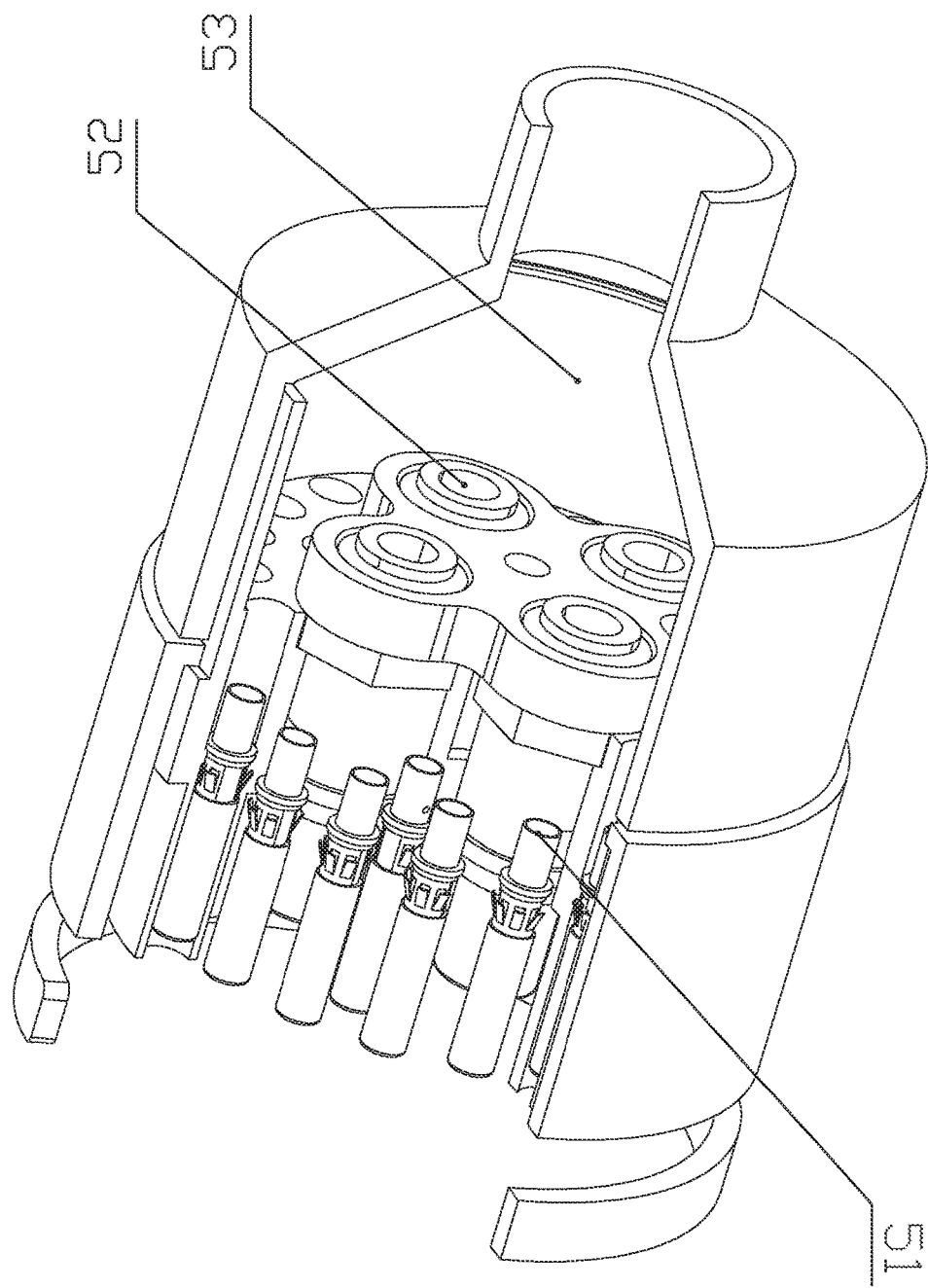

1 hose
2 straight hose segment
3 movable connector
4 stationary connector
5 spiral hose segment
6 first end segments of first flexible tube secondary fluid conductor
7 first end segments of first flexible tube main fluid conductor
8 electrical cables
9 first end segments of second flexible tube main fluid conductor
10 first end segments of second flexible tube secondary fluid conductor
11 fastening and locking element (first stationary connector)
12 electrical connection elements (first stationary connector)
13 fluid connection elements (first stationary connector)
14 protective cap
15 anchoring holes for vertical anchoring of the first stationary connector
16 anchoring holes for horizontal anchoring of the first stationary connector
17 anchoring slot
18 second fluid connection elements (first movable connector)
19 second electrical connection elements (first movable connector)
20 insulating rubber membrane (first movable connector)
21 adapter of the male connection (first fluid connection elements first stationary connector)
22 body of the male connection (first fluid connection elements first stationary connector)
23 piston of the male connection (first fluid connection elements first stationary connector)
24 sealing gasket of the male connection (first fluid connection elements first stationary connector)
25 contact face of the piston of the male connection (first fluid connection elements first stationary connector)

26 securing air bellows of the piston (first fluid connection elements first stationary connector)
27 sealing surface of the piston of the male connection (first fluid connection elements first stationary connector)
28 cylindrical contact surface of the male connection (first fluid connection elements first stationary connector)
29 abutment surface of the male connection (first fluid connection elements first stationary connector)
30 slotted element for passage of air through the piston in the male connection (first fluid connection elements first stationary connector)
31 elastic element in the male connection (first fluid connection elements first stationary connector)
32 through hole through the adapter of the male connection (first fluid connection elements first stationary connector)
33 sealing gasket in the female connection (second fluid connection elements first movable connector)
34 body of the female connection (second fluid connection elements first movable connector)
35 elastic element in the female connection (second fluid connection elements first movable connector)
36 slotted element for passage of air through the piston in the female connection
37 (second fluid connection elements first moveable connector) adapter of the female conncection (second fluid connection elements first movable connector)
38 through hole for air through the adapter of the female pneumatic connection (second fluid connection elements first movable connector)
39 piston of the female connection (second fluid connection elements first movable connector)
40 contact face of the piston of the female connection (second fluid connection elements first movable connector)
41 funnel mouth of the body of the female connection (second fluid connection elements first movable connector)
42 abutment face of the body of the female connection (second fluid connection elements first movable connector)
43 assembly of the male fluid connection in the coupled position with the air passage open
44 assembly of the female fluid connection in the position with the air passage open
45 air passage between male-female fluid connections
46 rear portion of the body of the stationary connector
47 intermediate portion of the bofy of the stationary connector
48 front portion of the body of the stationary connector
49 electrical input connections of the stationary connector
50 valves of the stationary connector
52 fluid passage
53 working fluid inlet of the movable connector
55 Valves of the movable connector
56 intermediate electrical connections of the stationary connector
57 internal chamber of the stationary connector
58 working fluid inlet of the stationary connector

DESCRIPTION OF SPECIFIC EMBODIMENTS OF THE INVENTION

The connection device whose embodiment is shown in the figures, comprises in a preferred embodiment first electrical connector elements (12) which are each connectable to an electricity power supply (not shown), first fluid connection elements (13) which are connectable to a working fluid supply (not shown), an electrical power feed line comprising a plurality of electrical cables (8) with corresponding second electrical connector elements (19) coupled at respective first ends of the electrical cables (8), and which are each connectable to one of the first electrical connector elements (12) in a male-female connection, a working fluid feed line comprising at least one flexible tube (6, 7, 9, 10) conducting a working fluid with a second fluid connection element (18) coupled at a first end of the at least one flexible tube (6, 7, 9, 10), designed to carry a working fluid selected among pneumatic fluids and hydraulic fluids, and which are each connectable to one of the first fluid connection elements (13), characterized in that the first electrical connector elements (12) of the electricity power feed line and the first fluid connection elements (13) of the working fluid feed line are grouped together in a fixed manner in a first stationary connector (4), and the second electrical connector elements (19) and the second fluid connection elements (18) are grouped together in a fixed manner in a first movable connector (3), disposed such that, when connecting the movable connector (3) to the stationary connector (4), each first electrical connector element (12) and each second electrical connector element (19) are connected to each other in a male-female electrical connection, or vice versa, and each first fluid connection element (13) and each second fluid connection element (18) are connected to each other in a male-female fluid connection, or vice versa, and at least first end segments of the electrical cables (8), and of each flexible fluid tube (6, 7, 9, 10) are disposed inside an elastically flexible hose (1) connected to the first movable connector (3).

In turn, and in a preferred embodiment of the invention, the opposite end of the elastically flexible hose (1) comprises a second movable connector (not shown) wherein third electrical connector elements and third fluid connection elements are grouped, inversely complementary to the ones existing in a second stationary connector (not shown) preferably located on the outside of the semi-trailer of the vehicle, and wherein fourth electrical connection elements and fourth fluid connection elements are grouped into a male-female connection.

The second stationary connector and the second movable connector may have inverse structures and functions similar to those of the first stationary connector (4) and the first movable connector (3), the grouping of at least two fluid connection lines and twenty-one electrical connection lines being envisaged, and preferably of four fluid connection lines and twenty-eight electrical connection lines, such that auxiliary lines of service are always available to the user both for adding functions and to replace possible failures of one of said lines without needing to replace the hose (1).

Through the first stationary connector (4), the first electrical connector elements (12) and each first fluid connection element (13) can be connected to the respective working fluid sources and power supplies, such as the power supplies existing in the tractor unit of a heavy motor vehicle for which the first stationary connector (4) may be assembled, for example, on the outer wall of the cabin of the tractor unit.

In one embodiment of the invention, the connection device further comprises a second movable connector wherein third electrical connector elements connected at second ends of the electrical cables and a third fluid connection element at a second end of each flexible tube are grouped together in a fixed manner. Furthermore, according to this embodiment, the connection device comprises a second stationary connector wherein fourth electrical connector elements which can be connected to the third additional electrical connector elements in a male-female connection, and at least a fourth fluid connection element which can be connected to each third fluid connection element are grouped together in a fixed manner. Preferably, the third and fourth electrical connector elements and the third and fourth fluid connection elements are disposed such that, when the movable connector is connected to the stationary connector, each third electrical connector element and each fourth electrical connector element are connected to each other in a female-male electrical connection, and each third fluid connection element and each fourth fluid connection element are connected to each other in a female-male fluid connection.

Through the second stationary connector, the fourth electrical connector elements and each fourth fluid connection element are connected to the respective parts and devices requiring power or such working fluids for the operation thereof, such as the elements which consume them in a trailer or semi-trailer for which the second stationary device is preferably mounted on the front of the trailer or semi-trailer and in a position facing the rear wall of the cabin of the tractor unit.

Preferably, the hose (1) comprises a spiral segment (5) and at least one flat end segment (2), each of which is connected to the movable connector and, in one embodiment of the invention, the at least one flexible tube (6, 7, 9, 10) of the working fluid feed line comprises at least one main flexible tube (7, 9) for passage of outlet working fluid coming out from the working fluid feed supply from the first fluid connection element (13) to the second fluid connection element (18), and at least one secondary flexible tube (6, 10) for passage of return working fluid coming from elements which consume working fluid.

A preferred embodiment of the first stationary connector (4) comprises a body made of electrically insulating material with a rear portion (46), an intermediate portion (47) and a front portion (48), such that the rear portion (46) of the body of the stationary connector (4) comprises electrical input connections (49) and at least one working fluid inlet (58), the intermediate portion (47) comprises intermediate electrical connections (56) which connect the electrical input connections (49) with the first electrical connection elements (12), and the front portion (48) comprises the first electrical connector elements (12) and the first fluid connection element(s) (13), wherein the first electrical connector elements (12) of the stationary connector (4) are disposed in the vicinity of the first fluid connection element(s) (13) in an area close to a front face of the front portion (48) of the body, while the second electrical connector elements (19) and the second fluid connection element(s) (18) of the movable connector (3) are disposed on a front face of the first movable connector (3) in a complementary manner with respect to the first electrical connector elements (12) and each first fluid connection element (13) in order to thus form respective male-female connections.

The first electrical connector elements (12) may be made up of electrical pins which form male electrical connector elements, and be surrounded by an external perimeter partition, the intermediate portion of the body preferably comprising an electrically insulating material and at least one internal chamber (57) which receives the working fluid entering through the inlet for working fluid and connected to at least one of the first fluid connection elements (13).

According to this embodiment, the first movable connector (3) comprises a main body with a front portion which has holes wherein electrical contact bushings are inserted which make up the second electrical connector elements (19) and wherein the electrical pins of the first stationary connector are inserted when the latter is coupled to the first movable connector (3) and in turn, each second working fluid connection element (18) can be a tubular passage a rigid front portion of which is located on the front face of the first movable connector (4) and makes up a male working fluid connection element which presses on and opens the corresponding valve (55) of the first female fluid connection element (44) in the first stationary connector (4). The rear portion of the tubular passage is located in the rear portion of the first movable connector (3), so that said rear portion of the tubular passage is connected to the flexible tube (6, 7, 9, 10) of the hose (1), and the intermediate portion of the tubular passage can be integrated into the main body of the movable connector (3).

According to this embodiment, each valve (55) will be opened by means of pressure, a manual operation or a combination of both, when the first movable connector (3) is completely coupled to the first stationary connector (4).

In the preferred embodiment of the invention, a fastening and interlocking element (11) is provided for fastening and interlocking the first stationary (4) and first movable (3) connectors to each other, which interlocking element (11) can be operated by a manual operation, pressure or a combination of both by the user in order to ensure coupling between both portions and the opening of the valves (55).

Preferably, the fastening and interlocking element (11) can be actuated in several stages or phases, in the first of which both first connectors (3, 4) face each other in the position with respect to each other and it is actuated by pressure, aided by the actuation of one or more pivots secured to the interlocking element which is inserted into an anchoring slot (17) of the other (complementary) first connector (3, 4) or vice versa.

Once the pivots have been channeled into at least one of the second segments of said anchoring slot (17), the movable connector can no longer be accidentally released, since the interlocking element (11) ensures the position of the first movable connector (3) and prevents it from being released, giving way to a rotational manual operation and next stage wherein the opening of valves (55) and transmission of compressed fluids will occur, the interlocking element (11) still being fixed in a positioner which prevents the first connectors (3, 4) from moving or turning if it is not due to a voluntary intervention of the user.

In a preferred embodiment, this latter effect can be achieved by sizing the channels through which the pivots are channelled such that they become narrower in the final segment thereof and give way to an area with a male-female fit wherein it remains retained.

In accordance with the preferred embodiment of the invention, when the first fluid connector element(s) (18) are pressurized and are to be separated from the first stationary connector (4), moving to the intermediate position of the interlocking element (11), the first movable connector (3) remains retained by the interlocking elements (11) but once the connection elements are separated in such a way that the air can exit through a hole and equalize the pressure of the inlet and outlet lines, thereby preventing the user from suffering possible accidental whiplash due to sudden and uncontrolled depressurization of the movable connector (3) or of a chamber (53) existing between both of them. Lastly, a last manual operation would be triggered that would result in the complete physical disconnection of both first connectors (3, 4).

In this embodiment, the coupling and decoupling between the second movable connector and the second stationary connector has the same phases and features described above with regard to the opening of the pneumatic valves (50) and manual operation of the interlocking fastening element (11), but inversely.

The valves (50) can be specifically manufactured, adapted to the stationary connector (4), or commercial valves (50), in any case they are operated by a manual operation on the casings to open the valves (50), all of them simultaneously with an element integrated into the casings. The valves (50) may be elements integrated into the same parts as those making up the casing, although in other embodiments these may be external elements adapted and inserted into the casing.

In both cases, the effect achieved is the same, and once the interconnection of the stationary (4) and movable (3) connector has been operated, the valves (50, 55) open the passage to the fluid of the corresponding lines, and when both connectors separate, the valves (50, 55) interrupt said passage.

In the preferred embodiment of the invention illustrated in the figures, the male fluid connection elements (43) comprise a male-connection body (22), on the rear portion thereof a male-connection adapter (21) or element for coupling to the flexible tube (6, 7, 9, 10) is coupled. In the front portion, it has at least one male cylindrical contact surface (28) which is introduced by pressure into the female connection (44) in order to perform the connection of air passage (45) and open the valves (55). The outer part of the male-connection body (22) comprises a male-connection annular abutment surface (29) with a diameter greater than that of the cylindrical contact surface (28) which functions as a female-connection abutment surface (42) comprising a female-connection body (34) of the female fluid connection elements (44) on the front-end portion thereof. The male-connection body (22) of the male pneumatic connection (43) comprises, inside the front-end portion thereof, at least one securing air bellows (26) which will prevent male-connection piston (23) from coming out of the connector.

Having established contact between the abutment surfaces (29, 42), the forward movement of the male fluid connector (43) inside the female fluid connector (44) is stopped mechanically.

In said abutment position, the air passage (45) inside both fluid connection elements is established and open, since for this purpose the male connection (43) has the at least one male-connection piston (23) which is movable along the inside of the male-connection body (22) of the male fluid connection (43). Said male-connection piston (23) maintains the resting position thereof closed by the action of at least one male-connection elastic element (31) and in said resting position, one or more male-connection sealing gaskets (24) close the passage between male-connection sealing surface (27) of the male-connection piston (23) and the male-connection body (22) of the pneumatic connection.

The male-connection piston (23) of the male fluid connector element travels through at least one complementary male-connection stationary slotted element (30) which has slots for the passage of air through them, and comprises a male-connection front contact surface (25) for contacting a female-connection piston front contact surface (40) of the piston (39) of the female fluid connection element (44).

In this embodiment, the female fluid connection element (44) has a body (34) in the rear portion of which it comprises a female-connection adapter (37) for the coupling thereof to the flexible tube (6, 7, 9, 10) of the pneumatic hose (1) provided with a female-connection passage hole (38) for passage of air. In the front portion, the female-connection body (34) comprises at least one female-connection abutment surface (42) for abutting the annular surface (29) of the outer portion of the male-connection body (22) of the male fluid connection element, and a female-connection funnel-shaped inside (41) in order to facilitate the entry of the male connection (43).

On the inside thereof, the female fluid connection element comprises at least one female-connection piston body (39), the front portion of which has a contact surface (40) which causes the movement of the male-connection piston (22) of the male fluid connector element (43) to be operated by pressure when both are assembled.

Said female-connection piston (39) is kept closed in the resting position by the action of at least one female-connection elastic element (35) disposed inside the female-connection body (34). In this embodiment and in said resting position, one or several female-connection sealing gaskets (33) prevent air from escaping from the female connection.

In the preferred embodiment illustrated in the figures, both pistons (23, 39) have the recoil stroke limited when colliding with corresponding slotted elements (30, 38) when pressure is exerted on both of them, which is when the air passage is opened once the coupling of the connectors is established.

What is claimed is:

1. A connection device comprising
    first electrical connector elements which are each connectable to an electricity power supply,
    first fluid connection elements which are connectable to a working fluid source,
    an electrical power feed line comprising a plurality of electrical cables with corresponding second electrical connector elements coupled at respective first ends of the electrical cables, and which are each connectable to one of the first electrical connector elements in a male-female connection,
    a working fluid feed line comprising at least one flexible tube which conducts a working fluid with a second fluid connection element coupled at a first end of a flexible tube, designed to carry a working fluid selected between pneumatic fluids and hydraulic fluids, and which are each connectable to a first fluid connection element in a first rapid connection,
    wherein the first electrical connector elements of the electrical power feed line and each first fluid connection element of the working fluid feed line are grouped together in a fixed manner in a first stationary connector;
    wherein the second electrical connector elements and each second fluid connection element are grouped together in a fixed manner in a first movable connector;
    wherein the first and second electrical connector elements and the first and second fluid connection elements are disposed such that, when the movable connector is connected to the first stationary connector, each first electrical connector element and each second electrical connector element are connected to each other in a male-female electrical connection, and each first fluid connection element and each second fluid connection element are connected to each other in a male-female fluid connection; and
    wherein at least first end segments of the electrical cables and of each flexible tube are all disposed inside an end of one single elastically flexible hose connected to the first movable connector
    the connection device further comprising, at an opposite end of the hose, a second movable connector comprising third electrical connector elements and third fluid connection elements grouped together in a fixed manner in a male-female connection;

the connection device further comprising a second stationary connector, comprising fourth electrical connection elements and fourth fluid connection elements, grouped and immobilized in a female connection and complementary to the third connector elements of the second movable connector;

wherein the third fluid connection element comprises a plurality of tubular projections with respective inner passages which each connect to one valve of the third fluid connection element, each projection making up a male connection element, the fourth fluid connection element making up a female working fluid connection element, comprising an inlet that surrounds a front mouth of a fluid passage and wherein the third fluid connection element fits when inserted into the respective second stationary connector, and wherein the female fluid connection element has a female-connection body in the rear portion of which it comprises a female-connection adapter for coupling thereof to the flexible tube, the female-connection adapter provided with a female-connection passage hole for passage of air and in the front portion the female-connection body comprises an abutment surface in complementary correspondence with the annular surface of the outer portion of the male-connection body, and a funnel-shaped inside in order to facilitate entry of the male connection elements.

2. The connection device of claim 1, wherein the first stationary connector comprises a body made of electrically insulating material with a rear portion, an intermediate portion and a front portion, wherein the rear portion of the body comprises electrical input connections and at least one working fluid inlet, wherein the intermediate portion comprises intermediate electrical connections which connect the electrical input connections to the first electrical connector elements, wherein the front portion comprises the first electrical connector elements and each first fluid connection element, wherein the first electrical connector elements of the first stationary connector are disposed next to the first fluid connection elements in a peripheral area of a front face of the front portion of the body of the first stationary connector, and wherein the second electrical connector elements and the second fluid connection element(s) of the movable connector are disposed on a front face of the first movable connector in a complementary manner with respect to the first electrical connector elements and each first fluid connection element in order to form respective male-female connections.

3. The connection device of claim 2, wherein the first electrical connector elements are made up of electrical pins, which form male electrical connector elements; and the first movable connector comprises a main body made of electrically insulating material with a front portion that has holes in which respective electrical contact bushings are located which make up the second electrical connector elements and wherein in said holes the electrical pins of the first stationary connector are to be inserted when said first stationary connector is coupled to the first movable connector, and the rear portions of the bushings are connected to the electrical cables.

4. The connection device of claim 2, wherein the intermediate portion of the body of the first stationary connector comprises at least one internal chamber for receiving the working fluid entering through the working fluid inlet and is connected to at least one of the first fluid connection elements, and wherein each first fluid connection element is a fluid fitting provided with a valve operable by pressure or a manual operation or a combination of both which closes the passage of the working fluid, for preventing the discharge thereof when the second fluid connection element is not inserted and which is unlocked when the corresponding second fluid connection element is inserted into the first fluid connection element and enables the passage of working fluid.

5. The connection device of claim 4, wherein each second fluid connection element is a fluid passage making up a male or female fluid connection element which presses on and, therefore, opens a corresponding valve of the first stationary connector when the first movable connector is connected to the first stationary connector and when the first fluid connection element is inserted into the respective second fluid connection element, wherein the rear portion of each fluid passage is connected to a corresponding one of the flexible tubes of the hose, the intermediate portion of the tubular passage being integrated in the main body of the first movable connector, and wherein each valve is constructed so as to be opened by means of pressure or manual operation when the first movable connector is connected to the first stationary connector.

6. The connection device of claim 5, wherein the first fluid connection element comprises a plurality of inlet passages which each connect to one valve of the first fluid connection elements, each inlet passage making up a fluid female connection element, wherein the second working fluid connection element makes up a male fluid connection element, and comprises a rigid front portion which surrounds a front mouth of the fluid passage and which fits into the inlet passage when the second fluid connection element is inserted into the respective first fluid connection element, and wherein the valve is configured to open when the first movable connector is connected to the first stationary connector, such that the contact face of the movable piston of the male connection of any of the first fluid connection elements of the first stationary connector pushes and moves the contact face of the movable piston of the female connection of the complementary second fluid connection element of the first movable connector, both retracting to a maximum opening point, and stopping by mechanical abutment, both being open and connected enabling the passage of the fluid through them.

7. The connection device of claim 5, wherein the first fluid connection element comprises a plurality of tubular projections with respective inner passages which each connect to one of the valves, each projection making up a male fluid connection element, and wherein the second fluid connection element makes up a female fluid connection element, and comprises a recess which surrounds the front mouth of the fluid passage and wherein it fits into the tubular projection when the second fluid connection element is inserted into the respective first fluid connection element.

8. The connection device of claim 1, wherein the fourth electrical connector elements comprise holes wherein respective electrical contact bushings are located which make up the fourth electrical connector elements and wherein the electrical pins of the second movable connector are inserted when it is coupled to the second stationary connector.

9. The connection device of claim 1, wherein the third and the fourth electrical connector elements and the third and fourth fluid connection elements are disposed such that, when the second movable connector is connected to the second stationary connector, each third electrical connector element and each fourth electrical connector element are connected to each other in a female-male electrical connection, and each third fluid connection element and each fourth fluid connection element are connected to each other in a female-male fluid connection.

10. The connection device of claim 1, wherein the male-female and female-male configuration of the first and second connector elements and of the third and fourth electrical and fluid connector elements respectively, and of the first and second stationary and movable connectors, can be inverted.

11. The connection device of claim 1, wherein the male fluid connector is configured so as to stop moving forward inside the female fluid connector once a contact has been established between the mechanical abutment surfaces;
wherein in said abutment position, the air passage inside both fluid connection elements is established and open, since for this purpose the male connection has at least one male-connection piston which is movable along the inside of the body of the male fluid connection
and wherein said male-connection piston maintains a resting position thereof closed by the action of at least one elastic element and in said resting position, one or more sealing gaskets close passage between a sealing surface of the male-connection piston and the male-connection body.

12. The connection device of claim 11, wherein the male fluid connection elements comprise a male-connection body, wherein on a rear portion of the male-connection body an male-connection adapter for coupling to the flexible tube is coupled, wherein in the front portion of said male-connection body it has a male cylindrical contact surface which is to be introduced by pressure in at least one complementary female-connection piston in the female fluid connection element in order to perform the connection of the air passage and open the valves, and wherein the outer portion of the male-connection body comprises at least one annular surface with a diameter greater than that of the male cylindrical contact surface which functions as a mechanical abutment surface by complementary correspondence with the surface comprised in the front-end portion of the female-connection body, and further comprising at least one complementary male-connection slotted element having slots for allowing passage of air therethrough and also having a front contact surface for contacting a front contact surface of the female-connection piston, and wherein the male-connection piston is movable through the at least one complementary male-connection slotted element, wherein the male-connection body comprises, inside the front-end portion thereof, at least one air bellows for preventing the male-connection piston from coming out of the connector.

13. The connection device of claim 12, wherein the female fluid connection element comprises within at least one female-connection piston body, the front portion of which has a contact surface for causing movement of the male-connection piston to be operated by pressure when both are assembled.

14. The connection device of claim 1, wherein the first stationary connector comprises vertical or horizontal anchoring holes for the fastening thereof to a selectable location of the vehicle or of a portion thereof.

15. The connection device of claim 1, comprising a plurality of flexible tubes and a plurality of electrical cables, such that auxiliary lines of service are always available to the user both for adding functions and to replace possible failures of one of said cables without needing to replace the hose.

16. A motor vehicle, comprising a tractor unit and a trailer or a semi-trailer, further comprising the connection device as described in claim 1, the tractor unit comprising:
the power supply to which the first electrical connector elements of the connection device are connected; and
the working fluid source, to which the first fluid connection elements of the connector device are connected;
the trailer or the semi-trailer comprising power consuming elements and working-fluid consuming elements, for respectively consuming energy from the power supply and from the working fluid source.

17. The connection device of claim 1, wherein the single elastically flexible hose comprises a spiral segment within which the electrical cables and each flexible fluid tube are located.

18. A connection device comprising:
first electrical connector elements which are each connectable to an electricity power supply,
first fluid connection elements which are connectable to a working fluid source,
an electrical power feed line comprising a plurality of electrical cables with corresponding second electrical connector elements coupled at respective first ends of the electrical cables, and which are each connectable to one of the first electrical connector elements in a male-female connection,
a working fluid feed line comprising at least one flexible tube which conducts a working fluid with a second fluid connection element coupled at a first end of a flexible tube, designed to carry a working fluid selected between pneumatic fluids and hydraulic fluids, and which are each connectable to a first fluid connection element in a first rapid connection,
wherein the first electrical connector elements of the electrical power feed line and each first fluid connection element of the working fluid feed line are grouped together in a fixed manner in a first stationary connector;
wherein the second electrical connector elements and each second fluid connection element are grouped together in a fixed manner in a first movable connector;
wherein the first and second electrical connector elements and the first and second fluid connection elements are disposed such that, when the movable connector is connected to the first stationary connector, each first electrical connector element and each second electrical connector element are connected to each other in a male-female electrical connection, and each first fluid connection element and each second fluid connection element are connected to each other in a male-female fluid connection; and
wherein at least first end segments of the electrical cables and of each flexible tube are all disposed inside an end of one single elastically flexible hose connected to the first movable connector;
wherein the first stationary connector comprises a body made of electrically insulating material with a rear portion, an intermediate portion and a front portion, wherein the rear portion of the body comprises electrical input connections and at least one working fluid inlet, wherein the intermediate portion comprises intermediate electrical connections which connect the electrical input connections to the first electrical connector elements, wherein the front portion comprises the first electrical connector elements and each first fluid connection element, wherein the first electrical connector elements of the first stationary connector are disposed next to the first fluid connection elements in a peripheral area of a front face of the front portion of the body of the first stationary connector, wherein the second electrical connector elements and the second fluid connection element(s) of the movable connector are disposed on a front face of the first movable connector in a complementary manner with respect to the first electrical connector elements and each first fluid connection element in order to form respective male-female connections;

wherein the intermediate portion of the body of the first stationary connector comprises at least one internal chamber for receiving the working fluid entering through the working fluid inlet and is connected to at least one of the first fluid connection elements, wherein each first fluid connection element is a fluid fitting provided with a valve operable by pressure or a manual operation or a combination of both which closes the passage of the working fluid, for preventing the discharge thereof when the second fluid connection element is not inserted and which is unlocked when the corresponding second fluid connection element is inserted into the first fluid connection element and enables the passage of working fluid;

wherein the stationary and movable connectors incorporate fastening and interlocking elements which are operable by pressure, manual operation or a combination of both, for fastening and interlocking the first stationary and first movable connectors to each other, the fastening and interlocking elements comprising pivots secured to the respective connector, in correspondence with anchoring slots in the complementary connector or vice versa, the fastening and interlocking elements being actuable by rotation according to several stages;

wherein in a first stage, the connectors are facing each other and the pivots are inserted into the slots, so that the movable connector can no longer be accidentally released and the valves of the movable connector and the valves of the fixed connector are not in contact, and therefore stay closed;

wherein, in a second stage, as rotation goes on, the valves contact to each other although the valves remain closed; and wherein in a third stage, as rotation goes on, the valves are in contact and open.

* * * * *